United States Patent
Tong (10) Patent No.: US 10,686,610 B2
(45) Date of Patent: Jun. 16, 2020

(54) METHOD AND APPARATUS FOR PUBLISHING WORK IN NETWORK

(71) Applicant: Alibaba Group Holding Limited, George Town (KY)

(72) Inventor: Jun Tong, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/418,797

(22) Filed: May 21, 2019

(65) Prior Publication Data

US 2019/0312735 A1   Oct. 10, 2019

Related U.S. Application Data

(63) Continuation of application No. PCT/CN2017/111542, filed on Nov. 17, 2017.

(30) Foreign Application Priority Data

Nov. 24, 2016 (CN) .......................... 2016 1 1053416

(51) Int. Cl.
*H04L 29/06* (2006.01)
*H04L 9/32* (2006.01)
(Continued)

(52) U.S. Cl.
CPC ......... *H04L 9/3247* (2013.01); *G06Q 10/101* (2013.01); *G06Q 10/103* (2013.01);
(Continued)

(58) Field of Classification Search
CPC .......................... H04L 9/3247; H04L 63/0428
See application file for complete search history.

(56) References Cited

U.S. PATENT DOCUMENTS

| 5,465,299 A | 11/1995 | Matsumoto et al. |
| 6,418,457 B1 | 7/2002 | Schmidt et al. |

(Continued)

FOREIGN PATENT DOCUMENTS

| CN | 1350255 | 5/2002 |
| CN | 1558303 A | 12/2004 |

(Continued)

OTHER PUBLICATIONS

PCT International Search Report and Written Opinion issued in International Application No. PCT/CN2017/111542 dated Feb. 7, 2018, 13 pages.

(Continued)

*Primary Examiner* — Michael R Vaughan
(74) *Attorney, Agent, or Firm* — Fish & Richardson P.C.

(57) ABSTRACT

The present application provides a method for publishing work in a network, including: obtaining, by an end-user device associated with a current user, a prior work file that is not published by the current user in a network, where the prior work file includes a digital signature of a prior author and a prior work; generating, by the end-user device and based on an operation of the current user, a new work file that includes the prior work, the digital signature of the prior author, and content added based on the operation of the current user; and publishing, by the end-user device, the new work file in the network. This solution ensures the prior work cannot be used out of context, and modifications to the prior work are easy to identify, thereby improving integrity and authenticity of a work propagated on the internet.

20 Claims, 6 Drawing Sheets

(51) Int. Cl.
*H04N 21/647* (2011.01)
*H04N 21/83* (2011.01)
*H04L 29/08* (2006.01)
*G06Q 10/10* (2012.01)

(52) U.S. Cl.
CPC .......... *H04L 63/0428* (2013.01); *H04L 67/06* (2013.01); *H04N 21/64715* (2013.01); *H04N 21/83* (2013.01); *H04N 2201/3233* (2013.01)

(56) References Cited

U.S. PATENT DOCUMENTS

| | | | |
|---|---|---|---|
| 6,601,172 B1 | 7/2003 | Epstein | |
| 6,610,104 B1* | 8/2003 | Lin ..................... | G06F 17/2288 |
| | | | 715/235 |
| 6,785,815 B1 | 8/2004 | Serret-Avila et al. | |
| 2003/0217264 A1* | 11/2003 | Martin ................ | G06F 21/6209 |
| | | | 713/156 |
| 2004/0236953 A1* | 11/2004 | Merenne ............. | H04L 63/0442 |
| | | | 713/182 |
| 2006/0085738 A1* | 4/2006 | Chapus ............... | G06F 17/2211 |
| | | | 715/255 |
| 2008/0120240 A1* | 5/2008 | Ginter .................... | G06F 21/10 |
| | | | 705/51 |
| 2011/0078458 A1 | 3/2011 | Furukawa et al. | |
| 2011/0080618 A1 | 4/2011 | Viswanathan et al. | |
| 2012/0185759 A1 | 7/2012 | Balinsky et al. | |
| 2013/0246901 A1* | 9/2013 | Massand ................ | G06F 17/24 |
| | | | 715/229 |
| 2015/0180670 A1 | 6/2015 | Yu | |

FOREIGN PATENT DOCUMENTS

| | | |
|---|---|---|
| CN | 101110020 A | 1/2008 |
| CN | 102479297 | 5/2012 |
| CN | 102541825 | 7/2012 |
| CN | 104462878 | 3/2015 |
| CN | 105488655 | 4/2016 |
| CN | 107026841 A | 8/2017 |
| EP | 2718849 | 4/2014 |
| TW | 201327440 | 7/2013 |
| WO | 2008150672 A1 | 12/2008 |

OTHER PUBLICATIONS

Crosby et al., "BlockChain Technology: Beyond Bitcoin," Sutardja Center for Entrepreneurship & Technology Technical Report, Oct. 16, 2015, 35 pages.

European Extended Search Report in European Patent Application No. 17873799.5, dated Aug. 7, 2019, 6 pages.

Nakamoto, "Bitcoin: A Peer-to-Peer Electronic Cash System," www.bitcoin.org, 2005, 9 pages.

* cited by examiner

METHOD AND APPARATUS FOR PUBLISHING WORK IN NETWORK

CROSS-REFERENCE TO RELATED APPLICATIONS

This application is a continuation of PCT Application No. PCT/CN2017/111542, filed on Nov. 17, 2017, which claims priority to Chinese Patent Application No. 201611053416.5, filed on Nov. 24, 2016, and each application is hereby incorporated by reference in its entirety.

TECHNICAL FIELD

The present application relates to the field of network communications technologies, and in particular, to a method and an apparatus for publishing a work in a network.

BACKGROUND

Reading habits change with development of Internet technologies and popularization of intelligent end-user devices. People now read news, learn knowledge, and appreciate literary works mainly on the Internet, instead of on printed materials. More authors directly publish their articles on the Internet for public reading. Similarly, forwarding of and comments on published articles are also directly published on the Internet without using any paper media.

However, because electronic data is easy to intercept and modify, after an article is published, others can randomly select some content of the article to comment on, or even make modifications to the original article during forwarding. Once a damaging effect is caused by certain commenting or forwarding behaviors, the author of an article can only clarify or explain his or her original idea to refute a rumor. Because the author cannot prove an original feature of the article, such clarification or explanation cannot achieve good result in practice.

SUMMARY

In view of this, the present application provides a method for publishing a work in a network, including: obtaining, by an end-user device, a prior work file that is not published by a current user in a network, where the prior work file includes a digital signature of a prior author and a prior work; generating, by the end-user device based on an operation of the current user, a new work file that includes the used prior work, where the new work file includes the digital signature of the prior author, the prior work, and content added based on the operation of the current user; and publishing, by the end-user device, the new work file in the network.

The present application further provides an apparatus for publishing a work in a network, including: a prior-work-file acquisition unit, configured to obtain a prior work file that is not published by a current user in a network, where the prior work file includes a digital signature of a prior author and a prior work; a new-work-file generation unit, configured to generate, based on an operation of the current user, a new work file that includes the used prior work, where the new work file includes the digital signature of the prior author, the prior work, and content added based on the operation of the current user; and a new-work-file publishing unit, configured to publish the new work file in the network.

It can be seen from the previous technical solutions that in the implementations of the present application, the prior author appends a digital signature to the prior work of the prior author, and then publishes the prior work, and when generating, based on the operation of the current user other than the prior author, the new work file that includes the used prior work, the end-user device adds the prior work and the digital signature of the prior author to the new work file. Therefore, the prior work cannot be used out of context, and modifications to the prior work are easy to identify, thereby improving integrity and authenticity of a work propagated on the Internet.

DESCRIPTION OF IMPLEMENTATIONS

Implementations of the present application provide a new method for publishing a work in a network. An author who publishes a prior work file publishes both a prior work and a digital signature of the author in a network. When generating a new work file by using the prior work based on an operation of a current user, an end-user device adds the prior work and the digital signature of the prior author to the new work file. As such, after the new work file is published, an audience of a new work can know an original feature of the prior work, and the digital signature of the prior author can ensure that the prior work is not tampered with, thereby improving integrity and authenticity of a work forwarded on the Internet, and alleviating a problem in the existing technology.

Figure 1:
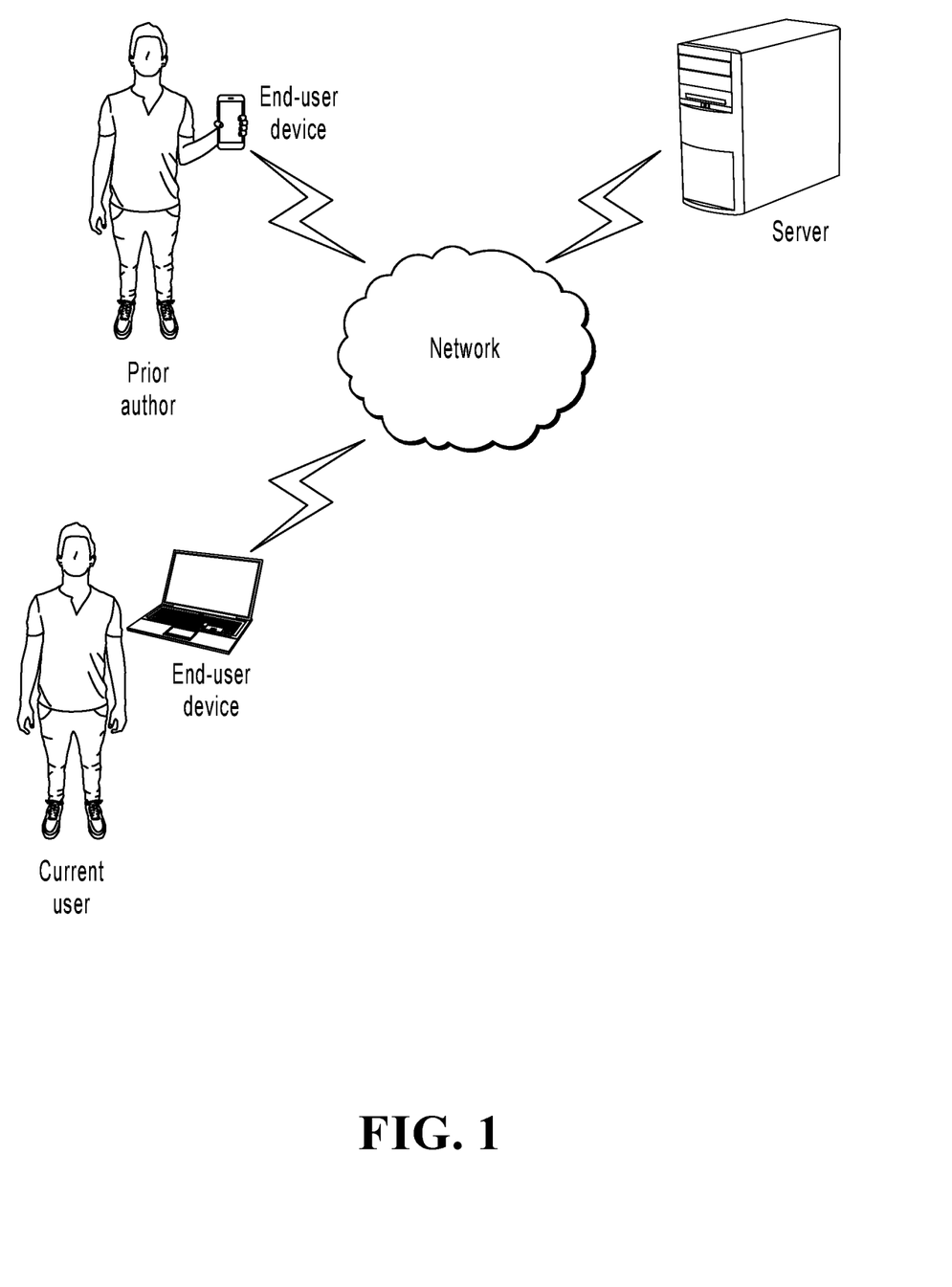
FIG. 1 is a network structure diagram illustrating an application scenario, according to an implementation of the present application.

An application scenario of the implementations of the present application is shown in FIG. 1. The prior author publishes the prior work file that includes the digital signature of the prior author in the network by operating a browser or application program client software running on an end-user device of the prior author. A specific process is as follows: The end-user device of the prior author uploads the prior work file to a server (a server accessed by the browser of the end-user device of the prior author or a server run by a serving end of the application program client software), and the server publishes the prior work file in the network (for example, adding a link of the prior work file to a web page, or pushing the prior work file to the application program client software). The current user (a user other than the prior author) can view the prior work on the end-user device used by the current user. In addition, the current user can further perform the method in the implementations of the present application on the end-user device of the current user, create a new work by using the prior work, and publish the new work by using the server.

The implementations of the present application can be run on any device with a computing and storage capability, for example, a physical device or a logical device such as a mobile phone, a tablet computer, a personal computer (PC), a notebook computer, a server, or a virtual machine. The physical device or the logical device is used by the current user as an end-user device.

Figure 2:
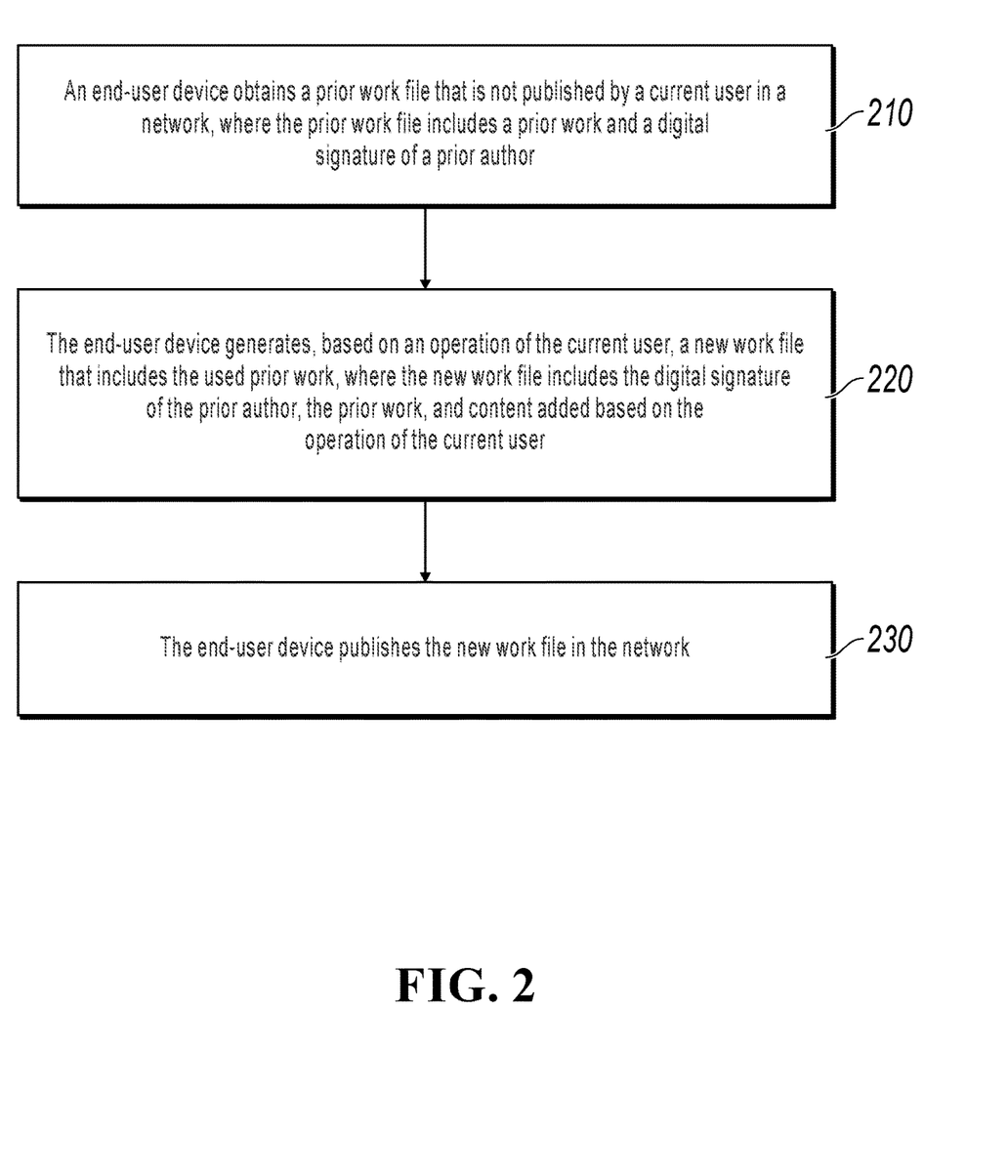
FIG. 2 is a flowchart illustrating a method for publishing a work in a network, according to an implementation of the present application.

In an implementation of the present application, a flowchart of a method for publishing a work in a network is shown in FIG. 2. The method is applied to an end-user device operated by a current user (a party responsible for a use behavior, such as a person or an organization that uses a work of another person in a work of the person or the organization).

Step 210: The end-user device obtains a prior work file that is not published by the current user in a network, where the prior work file includes a digital signature of a prior author and a prior work.

The current user can query and browse, in any way on the end-user device operated by the current user from various networks such as a public network and a private network, a work published by another person. The end-user device used by the current user obtains the prior work file from the network in a way corresponding to an operation of the current user, and the present implementation is not limited thereto. In the present implementation of present application, the prior work file is a work file that is published by another author (the prior author) other than the current user in the network, and the prior work file includes the prior work and the digital signature of the prior author for a part or all of the prior work.

The prior work can be any form that can be propagated in the network, such as an article, an image, an animation, audio, or a video, and the present implementation is not limited thereto. The prior work can be an original work, namely, a work created by an original author (without using a work of another person), or can be a work generated by using a work of another person, and the work is referred to as a work of a prior user.

If the prior work is an original work, there is only one party that is prior author, and a digital signature of the prior author is a digital signature appended by the prior author to the original work by using a private signature key of the prior author. If the prior work is a work of a prior user, the prior author includes an original author and one or more prior users, and a digital signature of the prior user can be one or more of a digital signature of the original author and digital signatures of the prior users.

Step 220: Generate, based on an operation of the current user, a new work file that includes the used prior work, where the new work file includes the prior work, the digital signature of the prior author, the prior work, and content added based on the operation of the current user.

After browsing the obtained prior work, the current user can generate a new work by using a device of the current user and the prior work. Using the prior work includes forwarding, commenting, quoting, annotating, etc. The present implementation of the present application is not limited thereto.

Based on a specific application environment, the end-user device receives a corresponding operation instruction of the current user, and generates the new work file based on the prior work file. Generally, the end-user device adds some content based on the operation of the current user when generating the new work file. The content can be content related to a use method (for example, when the prior work is forwarded, a word "forwarding" is usually added, and sometimes a source of the forwarded prior work is further added), or can be content created by the current user (for example, when the prior work is annotated, interpretations of some content in the prior work by the current user are added). The new work file includes the content added based on the operation of the current user, and further includes the prior work and digital signatures of all prior authors in the prior work file.

The prior work in the new work file can enable a user who browses the new work to know an original feature of the used prior work, and to understand the prior work and the new work based on a complete expression of the prior work. The digital signature of the prior author can be used to verify whether the prior work used in the new work file is modified, to protect authenticity of the prior work.

After the end-user device publishes the new work file of the current user in the network, the new work can also be used as a prior work for another person to use. If the current user wants to protect integrity and authenticity of the new work in use, a digital signature of the current user can be added to the new work file by using the end-user device of the current user. The end-user device can append, by using a private signature key used by the current user for identity authentication, a digital signature to the content added based on the operation of the current user in the new work file, or can append, by using a private signature key of the current user, a digital signature to the content added based on the operation of the current user and the prior work in the new work file, and encapsulate the digital signature of the current user into the new work file.

In an implementation, the end-user device can perform signature verification on the prior work by using the digital signature of the prior author when generating the new work file. If the signature verification succeeds, the end-user device generates the new work file that includes the content added based on the operation of the current user, the digital signature of the prior author, and the prior work. Otherwise, the end-user device refuses to generate a new work file, or generates a work file with a signature verification failure mark. Specific implementation of the signature verification failure mark can be determined based on an actual application environment. For example, the signature verification failure mark can be a mark field in the generated work file. When the mark field is a certain value, it indicates that the signature verification fails. For another example, in an application scenario in which all authors (including the original author, all the prior users, and the current user) append digital signatures to the published work, a digital signature whose signature verification fails may not be included in the generated work file when the signature verification fails. As such, after the generated work file is published, an audience of the work can learn of a time at which the used prior work may be modified.

In addition, the new work file can further include a publishing address of the prior work file in the network, so that an audience of the new work can further know the prior author, background information of the prior work, a related author, a related work, etc.

Step 230: The end-user device publishes the new work file in the network.

The end-user device publishes, based on an operation instruction of the current user, the generated new work file at a predetermined network address, a network address determined by a serving end, or a network address designated by the current user.

In some application scenarios, an end-user device used by an author of a work can encrypt content of the work by using a private encryption key of the author. A propagation range of a public encryption key corresponding to the private encryption key is controlled, so that only a specific audience who obtains the public encryption key of the author can browse and use the work of the author. For example, the prior work in the prior work file can be ciphertext encrypted by an end-user device of the prior author by using a private encryption key of the prior author. For another example, the end-user device can first encrypt, by using a private encryption key of the current user, the prior work and the content added based on the operation of the current user, and then encapsulate the ciphertext into the new work file.

It is worthwhile to note that the private encryption key and the private signature key of the prior author or the current user can be the same private key, or different private keys can be used for encryption and signature.

It can be seen that in the present implementation of the present application, the author of the prior work publishes both the digital signature of the author and the prior work in the network, and when generating, based on the operation of the current user, the new work file that includes the used prior work, the end-user device adds the prior work and the digital signature of the prior author to the new work file, so that the audience of the new work can know complete content of the prior work, and the digital signature of the prior author is used to ensure that the prior work is not tampered with. Therefore, the prior work cannot be used out of context, and modifications to the prior work are easy to identify, thereby improving integrity and authenticity of a work propagated on the Internet.

The present implementation of the present application can be applied by using different mechanisms based on a traceable requirement on integrity and authenticity of a work in an actual application environment. Two methods are used as examples below for description.

In the first method, authors (including an original author and a user who uses a work of another person) determine whether to append a digital signature. When generating the new work file that includes the used prior work, the end-user device needs to add the prior work and the digital signature of the prior author to the generated new work file if the prior work file includes the digital signature, otherwise, may not add the prior work and the digital signature of the prior author. The current user can choose whether to append a digital signature to the generated new work file.

In the second method, all works include digital signatures of authors. As such, the prior work file usually includes the original work, content added by all the prior users, the digital signature of the original author, and the digital signatures of all the prior users. On this basis, the content added by the current user and the digital signature of the current user are usually added to the new work file. In this method, authenticity and integrity of a work in the network is traceable in the whole process.

Figure 3:
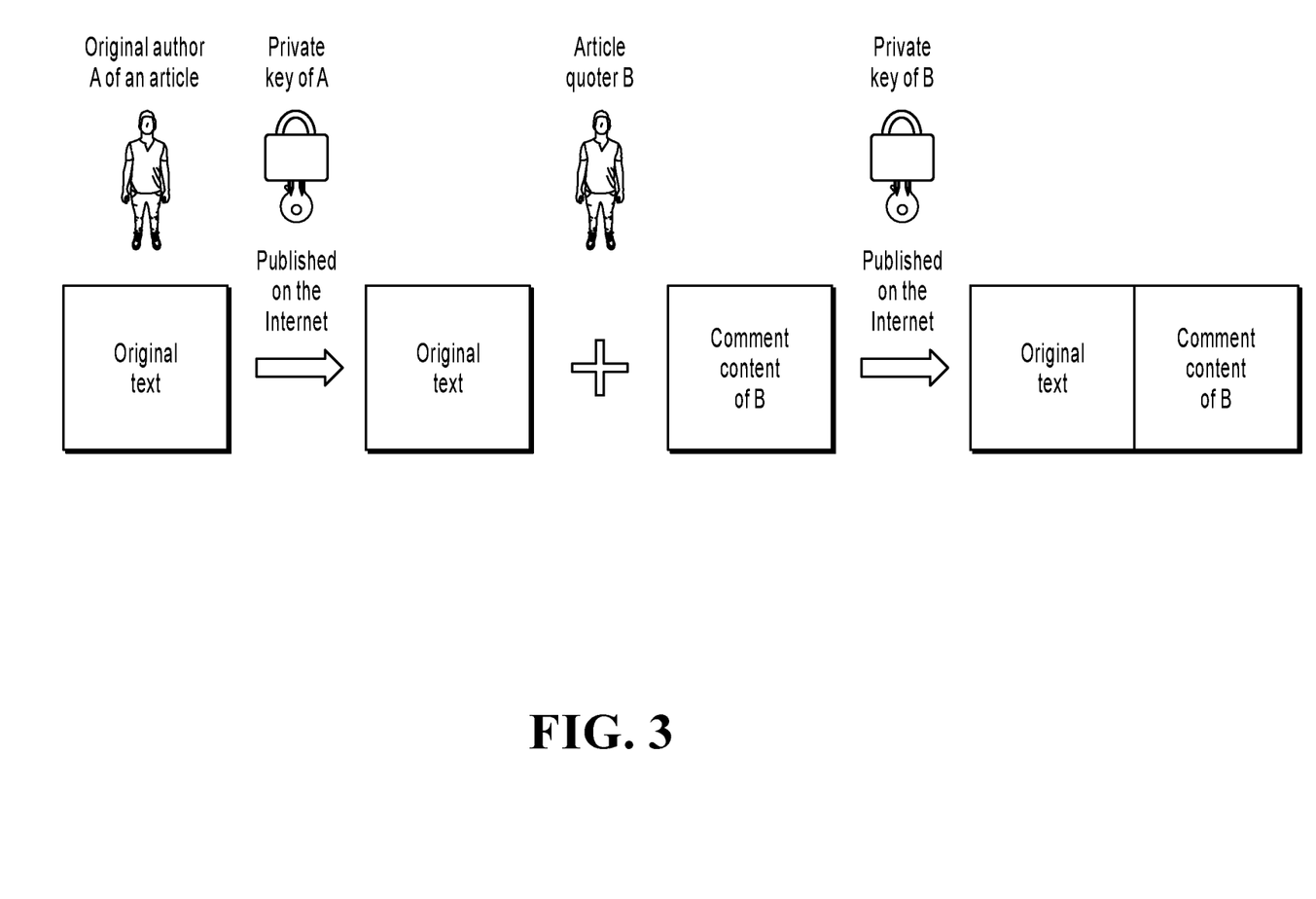
FIG. 3 is a schematic flowchart illustrating publishing an original work file and generating a new work file that includes a used work of another person, according to an application example of the present application.

In an application example of the present application, each article published on the Internet includes a digital signature of an author of the article, and content of the article is encrypted by using a private key of the author. Referring to FIG. 3, for example, original author A publishes an original work file on the Internet. The original work file includes ciphertext obtained by encrypting an original work by using a private key of original author A and a digital signature appended to the original work by using the private key of original author A. After original author A publishes the original work file on the Internet, all users who can obtain a public key of original author A can read the original work.

Assume that reader B is permitted to obtain the public key of original author A. After reading the original work by using a mobile phone (an end-user device) of reader B, reader B wants to publish a review article of the original work. Based on an operation of current user B, the mobile phone of reader B (current user B) performs signature verification on the decrypted original work by using the public key of original author A. If the signature verification succeeds, current user B appends a digital signature to the original work and comment content of current user B by using a private key of current user B, and the mobile phone encrypts the original work and the comment content of current user B by using the private key of current user B, encapsulates the ciphertext, the digital signature of original author A, and the digital signature of current user B into a comment work file, and publishes the comment work file on the Internet based on an instruction of current user B. If the signature verification fails, the mobile phone appends a digital signature to the original work and comment content of current user B by using a private key of current user B, encrypts the original work and the comment content of current user B by using the private key of current user B, encapsulates the ciphertext and the digital signature of current user B into a comment article, and publishes the comment article based on an instruction of current user B.

Assume that reader C is permitted to obtain a public key of current user B. If a mobile phone of reader C finds that the comment work file does not include the digital signature of original author A, when displaying the comment content and the original work to reader C, the mobile phone can notify reader C that signature verification on the original work fails.

Figure 4:
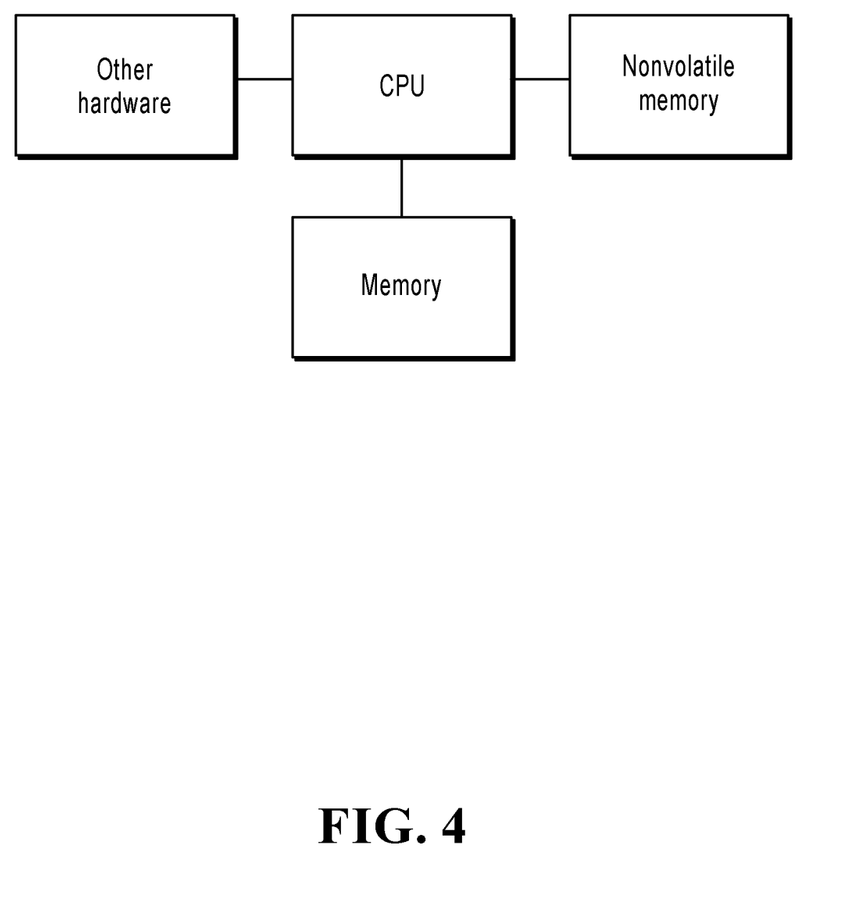
FIG. 4 is a hardware structure diagram illustrating an end-user device, according to an implementation of the present application.

Corresponding to the previous procedure implementation, an implementation of the present application further provides an apparatus for publishing a work in a network. The apparatus can be implemented by software, can be implemented by hardware, or can be implemented by a combination of hardware and software. In an example of software implementation, a logical apparatus is formed in the following way: A central processing unit (CPU) of an end-user device reads a corresponding computer program instruction to a memory, and the computer program instruction runs to form the apparatus. In terms of hardware, in addition to a CPU, a memory, and a nonvolatile memory shown in FIG. 4, the end-user device where the apparatus for publishing a work in a network is located usually includes other hardware such as a chip configured to receive and send a radio signal and/or other hardware such as a card configured to implement a network communication function.

Figure 5:
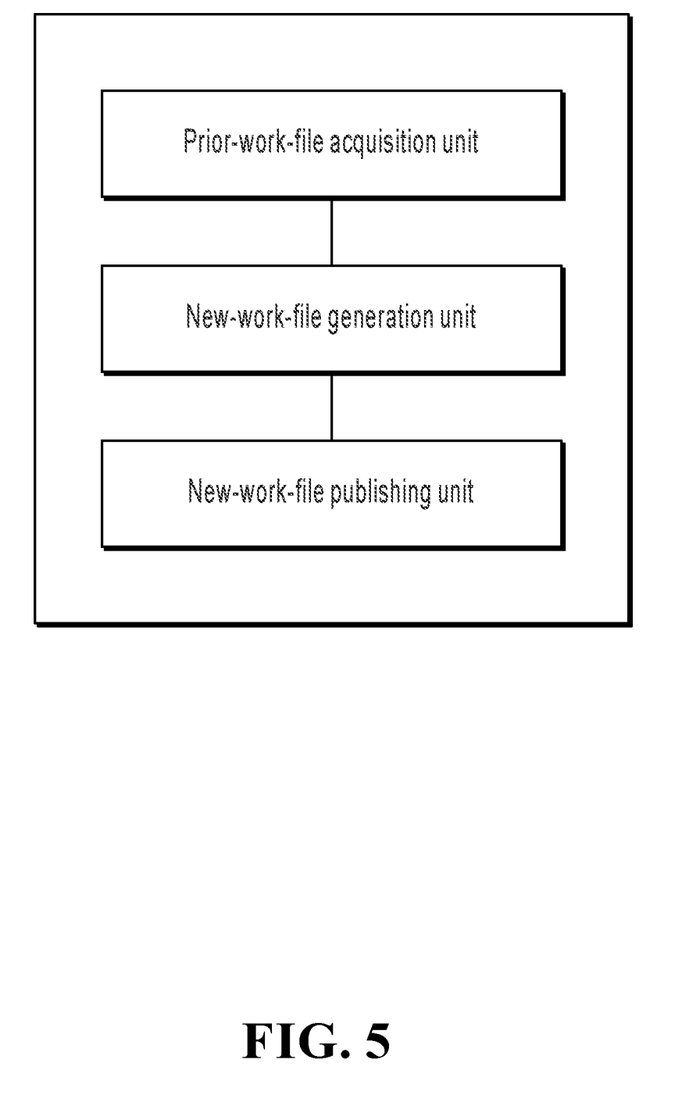
FIG. 5 is a logical structural diagram illustrating an apparatus for publishing a work in a network, according to an implementation of the present application.

FIG. 5 illustrates an implementation apparatus for publishing a work in a network, according to an implementation of the present application, including a prior-work-file acquisition unit, a new-work-file generation unit, and a new-work-file publishing unit. The prior-work-file acquisition unit is configured to obtain a prior work file that is not published by a current user in a network, where the prior work file includes a digital signature of a prior author and a prior work. The new-work-file generation unit is configured to generate, based on an operation of the current user, a new work file that includes the used prior work, where the new work file includes the digital signature of the prior author, the prior work, and content added based on the operation of the current user. The new-work-file publishing unit is configured to publish the new work file in the network.

Optionally, the prior work in the prior work file is encrypted by using a private encryption key of the prior author, and/or the prior work and the content added based on the operation of the current user in the new work file are encrypted by using a private encryption key of the current user.

In an implementation, the new work file further includes a digital signature of the current user.

In the previous implementations, the digital signature of the current user can be a digital signature appended, by using a private signature key of the current user, to the content added based on the operation of the current user.

In the previous implementations, the digital signature of the current user can be a digital signature appended, by using a private signature key of the current user, to the prior work and the content added based on the operation of the current user.

Optionally, the new-work-file generation unit is configured to perform signature verification on the prior work by using the digital signature of the prior author, and generate the new work file that includes the used prior work if the signature verification succeeds, otherwise, refuse to generate a new work file or generate a work with a signature verification failure mark.

Optionally, using the prior work includes: forwarding the prior work or commenting on the prior work.

Optionally, the new work file further includes a publishing address of the prior work file in the network.

The previous descriptions are merely examples of implementations of the present application, but are not intended to limit the present application. Any modification, equivalent replacement, or improvement made without departing from the spirit and principle of the present application should fall within the protection scope of the present application.

In a typical configuration, a computing device includes one or more processors (CPU), one or more input/output interfaces, one or more network interfaces, and one or more memories.

The memory may include a non-persistent memory, a random access memory (RAM), and/or a nonvolatile memory in a computer readable medium, for example, a read-only memory (ROM) or a flash memory (flash RAM). The memory is an example of the computer readable medium.

The computer readable medium includes persistent, non-persistent, removable, and irremovable media that can store information by using any method or technology. The information can be a computer readable instruction, a data structure, a program module, or other data. Examples of the computer storage medium include but are not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible by the computing device. As described in the present specification, the computer readable medium does not include computer-readable transitory media (transitory media) such as a modulated data signal and a carrier.

It is worthwhile to further note that the terms "include", "comprise", or their any other variants are intended to cover a non-exclusive inclusion, so that a process, a method, a product or a device that includes a list of elements not only includes those elements but also includes other elements which are not expressly listed, or further includes elements inherent to such process, method, product or device. An element described by "includes a . . . " further includes, without more constraints, another same or identical element in the process, method, article, or device that includes the element.

A person skilled in the art should understand that an implementation of the present application can be provided as a method, a system, or a computer program product. Therefore, the present application can use a form of hardware-only implementations, software-only implementations, or implementations with a combination of software and hardware. Moreover, the present application can use a form of a computer program product that is implemented on one or more computer-usable storage media (including but not limited to a disk memory, a CD-ROM, an optical memory, etc.) that include computer-usable program code.

As described herein, the present solution and description relates to implementations of digital signatures when publishing content in a networked environment. In particular, example methods include obtaining, by a current user operating an end-user device, a prior work file (for example, an article, image, animation, audio, video, literary work, any suitable combination, etc.) that is published by a prior user in a network, where the prior user is different than the current user. The prior work file can include prior work and the digital signature of the prior author. The current user can then, through one or more operations or interactions with the prior work file, generate a new work file. The new work file comprises the prior work, the digital signature of the prior author, and content added by the current user. In some instances, the new work file comprises a digital signature of the current user. The new work file is then published to the network.

The proposed solution provides various technical advantages. By creating digitally signed documents that are traceable to the original author, the described solution can prevent the prior work from being taken out of context, and ensures modifications to the prior work are easy to identify. The present solution ensures that an original author is able to prove the original features of the prior work by authenticating the prior work using the digital signature of the prior author, thereby preventing others from intercepting and modifying data without the consent of the original and/or prior author. Additionally, using a controlled encryption key, the original author can ensure that only a specific audience with access to the public encryption key of the author can access and use, update or modify the work of the original author.

Figure 6:
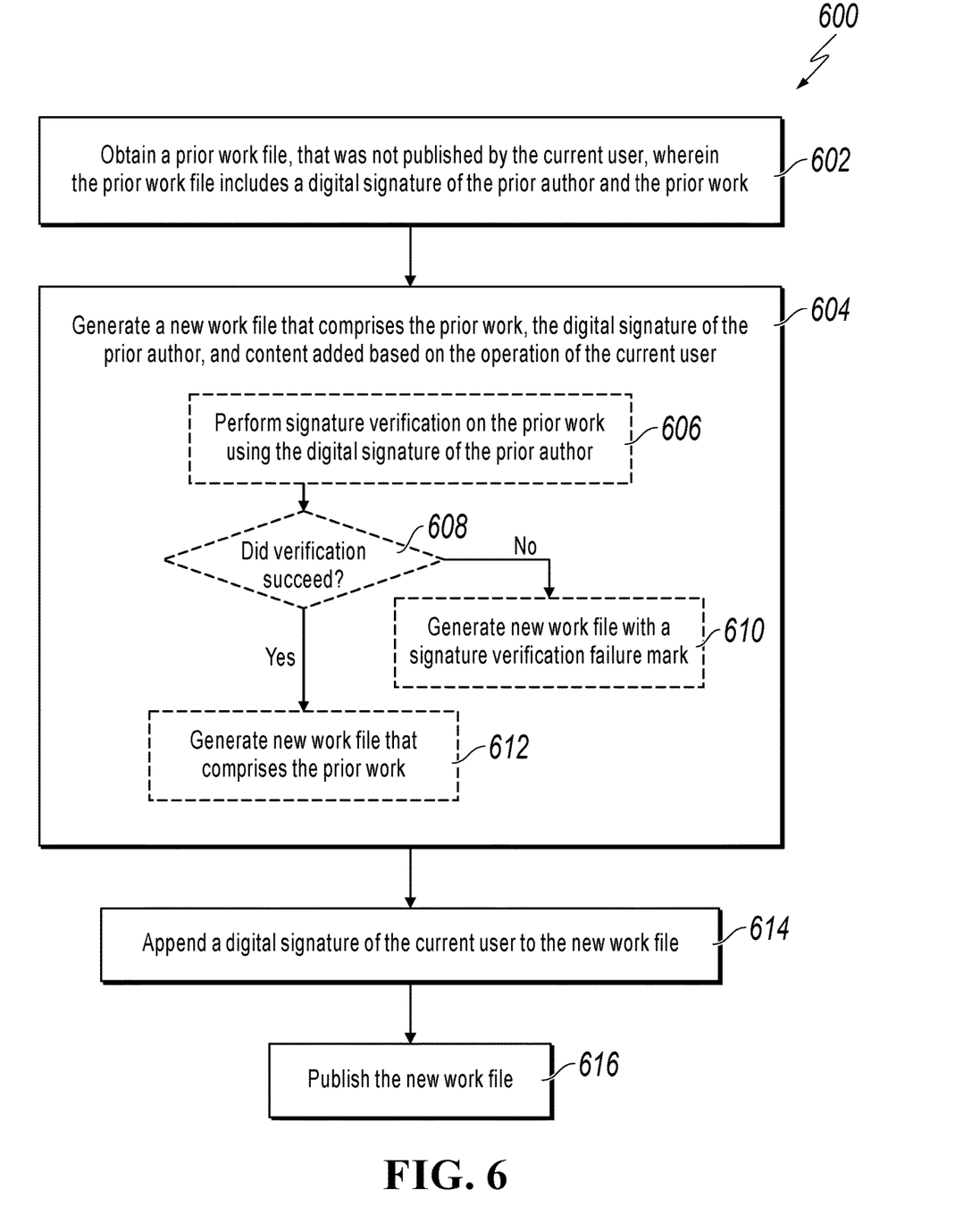
FIG. 6 is a flowchart illustrating an example of a computer-implemented method for publishing a work file in a network, according to an implementation of the present disclosure.

FIG. 6 is a flowchart illustrating an example of a computer-implemented method 600 for publishing work in a network, according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

At 602, an end-user device obtains a prior work file that was published by a prior author, where the prior author is different than the user of the end-user device. The prior work file can have been published on a computer network with a digital signature of the prior author. The prior work may be any media that can be published throughout a computer network. For example, the prior work may be an article, image, animation, audio, video, literary work, any suitable combination, or other suitable work or files.

In one example, the prior work is an original work and has a single prior author. In such cases, a prior work file may have a digital signature appended to the prior work by the original author using a private signature key specific to the original author.

In a second example, the prior work can have multiple previous users. In this instance, the prior work can include an original author and one or more prior users who have added content to the prior work, or otherwise modified the prior work. A prior work file associated with, and including the prior work can then contain or be associated with the digital signature of the original author, as well as a digital signature for each of the prior users.

The prior work may optionally be encrypted using the private encryption key of the prior author. From 602, method 600 proceeds to 604.

At 604, the end-user device generates a new work file that includes the prior work, the digital signature of the prior author, and content added based on the current user's operations. The new work file may optionally be encrypted using the current user's private encryption key. In some instances, the new work file may also include the digital signature of the current user. In one implementation, the current user's digital signature is created using the current user's private encryption key, and the current user's digital signature is appended to the content that has been added based on the current user's operations. Optionally, the current user's digital signature can be appended to both the added content and the prior work.

In another implementation the added content is categorized by a method of use of the prior work. Some examples of methods of use may include forwarding the prior work, annotating or commenting on the prior work, performing other types of modifications applied to the prior work, and adding additional content in addition to the prior work, among others.

In one implementation, during the generating step 604, the digital signatures on the new work may be verified. This process is described starting at 606.

At 606, the end-user device performs a verification on the decrypted prior work using a public key of the prior user. This verification ensures that the prior work is authentic. From 606, method 600 proceeds to 608.

At 608, a status of the verification is determined. If it is determined that the verification succeeded and a valid digital signature exists, method 600 proceeds to 612. Otherwise, if it is determined that the verification did not succeed and a digital signature of the prior work is invalid, method 600 proceeds to 610. At 610, the verification on the prior work has failed. The end-user device may be configured to refuse to generate a new work file, at which point method 600 stops, or the end-user device may generate a work file with a signature verification failure mark. The verification failure mark can notify future users that the new work does not include verified digital signatures and may not be authentic. Method 600 may then proceed to 614 or 616.

At 612, a new work file is generated. The new work file including the prior work, the digital signature of the prior author, and the work or content created by the current user. Optionally, from 612, method 600 proceeds to 614.

At 614, a digital signature, generated using the private key of the current user, is appended to the new work. In some instances, the new work file encapsulates the digital signature of the prior author, the prior work, and the new work. From 614, method 600 proceeds to 616.

At 616, the new work file is published to the network. The new work file may optionally be published with the network address of the prior work, thus allowing future users to verify the prior author and any applicable background information relating to the prior work, a related author, or related work, among others. At 606, method 600 stops.

The described solution allows users to publish work in a network environment that is easily verifiable and traceable to the author. It further allows other users to add new work to existing work, or modify work, while preventing unauthorized modifications, or presentation without context, of another user's work. Additionally because access can be controlled to a public decryption key, an author can ensure that only a specific audience is able to browse and use (e.g., modify, update, or otherwise change or interact with) the work of that author.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, mobile telephones (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for publishing work in a network, the method comprising:

obtaining, by an end-user device associated with a current user, a published prior work file that is not published by the current user in a network, wherein the prior work file comprises a digital signature of a prior author and a prior work;

performing a signature verification on the prior work using the digital signature of the prior author;

determining whether the signature verification is a success or failure;

in response to determining that the signature verification is a success, generating, by the end-user device and based on an operation of the current user, a new work file that comprises the prior work, the digital signature of the prior author, and content added based on the operation of the current user;

in response to determining that the signature verification is a failure, generating, by the end-user device and based on an operation of the current user, a new work file that comprises the prior work, the digital signature of the prior author, and a signature verification failure mark; and publishing, by the end-user device, the new work file in the network.

2. The computer-implemented method of claim 1, wherein the prior work in the prior work file is encrypted using a private encryption key of the prior author.

3. The computer-implemented method of claim 1, wherein the prior work and the content added based on the operation of the current user in the new work file are encrypted using a private encryption key of the current user.

4. The computer-implemented method of claim 1, wherein the new work file further comprises a digital signature of the current user.

5. The computer-implemented method of claim 4, wherein the digital signature of the current user comprises a digital signature appended, using a private signature key of the current user, to the content added based on the operation of the current user.

6. The computer-implemented method of claim 5, wherein the digital signature is further appended to the prior work.

7. The computer-implemented method of claim 1, wherein the content added based on the operation of the current user comprises content related to a method of use of the prior work or content created by the current user.

8. The computer-implemented method of claim 7, wherein the method of use of the prior work comprises forwarding the prior work.

9. The computer-implemented method of claim 7, wherein content created by the current user comprises annotations or comments on the prior work.

10. The computer-implemented method of claim 1, wherein the new work file further comprises a publishing address of the prior work file in the network.

11. The computer-implemented method of claim 1, wherein the prior work comprises prior literary work.

12. The computer-implemented method of claim 1, wherein the prior work file comprises a plurality of digital signatures from a plurality of prior authors and a plurality of prior works, and wherein each digital signature is associated with a particular prior author.

13. The computer implemented method of claim 12, wherein performing the signature verification on the prior work comprises performing a signature verification on each digital signature, and wherein determining whether the signature verification succeeds is done for each digital signature.

14. The computer implemented method of claim 13, wherein the signature verification failure mark indicates which digital signature verification did not succeed, and wherein the signature verification failure mark indicates to an audience of the published new work file a time when the digital signature verification did not succeed.

15. A non-transitory, computer-readable medium storing one or more instructions executable by a computer system to perform operations comprising:
  obtaining, by an end-user device associated with a current user, a published prior work file that is not published by the current user in a network, wherein the prior work file comprises a digital signature of a prior author and a prior work;
  performing a signature verification on the prior work using the digital signature of the prior author;
  determining whether the signature verification is a success or failure;
  in response to determining that the verification is a success, generating, by the end-user device and based on an operation of the current user, a new work file that comprises the prior work, the digital signature of the prior author, and content added based on the operation of the current user;
  in response to determining that the verification is a failure, generating, by the end-user device and based on an operation of the current user, a new work file that comprises the prior work, the digital signature of the prior author, and a signature verification failure mark; and
  publishing, by the end-user device, the new work file in the network.

16. The computer-readable medium of claim 15, wherein the prior work in the prior work file is encrypted using a private encryption key of the prior author.

17. The computer-readable medium of claim 15, wherein the prior work and the content added based on the operation of the current user in the new work file are encrypted using a private encryption key of the current user, and wherein the new work file further comprises a digital signature of the current user, wherein the digital signature of the current user comprises a digital signature appended, using a private signature key of the current user, to the prior work and the content added based on the operation of the current user.

18. The computer-readable medium of claim 15, wherein the content added based on the operation of the current user comprises content related to a method of use of the prior work or content created by the current user, wherein the method of use comprises forwarding the prior work, or annotations or comments on the prior work.

19. The computer-readable medium of claim 15, wherein the new work file further comprises a publishing address of the prior work file in the network.

20. A computer-implemented system, comprising:
  one or more computers; and
  one or more computer memory devices interoperably coupled with the one or more computers and having tangible, non-transitory, machine-readable media storing one or more instructions that, when executed by the one or more computers, perform one or more operations comprising:
    obtaining, by an end-user device associated with a current user, a published prior work file that is not published by the current user in a network, wherein the prior work file comprises a digital signature of a prior author and a prior work;
    performing a signature verification on the prior work using the digital signature of the prior author;
    determining whether the signature verification is a success or failure;
    in response to determining that the verification is a success, generating, by the end-user device and based on an operation of the current user, a new work file that comprises the prior work, the digital signature of the prior author, and content added based on the operation of the current user;
    in response to determining that the verification is a failure, generating, by the end-user device and based on an operation of the current user, a new work file that comprises the prior work, the digital signature of the prior author, and a signature verification failure mark; and
    publishing, by the end-user device, the new work file in the network.

* * * * *

UNITED STATES PATENT AND TRADEMARK OFFICE
CERTIFICATE OF CORRECTION

PATENT NO. : 10,686,610 B2
APPLICATION NO. : 16/418797
DATED : June 16, 2020
INVENTOR(S) : Jun Tong Page 1 of 1

It is certified that error appears in the above-identified patent and that said Letters Patent is hereby corrected as shown below:

In the Claims

Column 13, Line 39, Claim 13, delete "computer implemented" and insert -- computer-implemented --, therefor.

Column 13, Line 45, Claim 14, delete "computer implemented" and insert -- computer-implemented --, therefor.

Signed and Sealed this
Eleventh Day of August, 2020

Andrei Iancu
*Director of the United States Patent and Trademark Office*